United States Patent [19]

Reedom

[11] Patent Number: 5,005,866
[45] Date of Patent: * Apr. 9, 1991

[54] SEAT BELT CUSHION IN THE FORM OF PEOPLE PLACES AND THINGS

[76] Inventor: Eddie R. Reedom, P.O. Box 754, Pixley, Calif. 93256

[*] Notice: The portion of the term of this patent subsequent to Feb. 9, 2005 has been disclaimed.

[21] Appl. No.: 859,400

[22] Filed: May 5, 1986

[51] Int. Cl.⁵ .............................................. B60R 22/00
[52] U.S. Cl. ..................................... 280/801; 297/482
[58] Field of Search ...................... 280/801, 808, 751; 297/482; 446/321, 488

[56] References Cited

U.S. PATENT DOCUMENTS

| | | | |
|---|---|---|---|
| 3,936,075 | 2/1976 | Jelliffe | 280/751 |
| 3,941,404 | 3/1976 | Otaegui-Ugarte | 280/751 |
| 4,057,181 | 11/1977 | Finnigan | 297/482 |
| 4,089,545 | 5/1978 | Ferry | 280/751 |
| 4,336,665 | 6/1982 | Moreau | 446/321 |
| 4,595,618 | 6/1986 | Caringer | 297/482 |
| 4,614,505 | 9/1986 | Schneider et al. | 446/321 |

FOREIGN PATENT DOCUMENTS

| | | | |
|---|---|---|---|
| 609010 | 11/1960 | Canada | 446/321 |
| 2725850 | 12/1978 | Fed. Rep. of Germany | 280/808 |
| 694407 | 10/1979 | U.S.S.R. | 280/808 |

Primary Examiner—Kenneth R. Rice
Attorney, Agent, or Firm—Robert Schaap

[57] ABSTRACT

Novel seat belt cushions in the form of people, places, things, birds, animals and in particular animals such as bunnies, bears, and pandas. These cushions may be constructed with a plurality of sections, limbs and objects and may be adapted with electronic devices or the like. The cushions are constructed of one or more sheets of foam padding encased by a cotton or synthetic fiber outer layer. In a preferred embodiment, lighting effects, small battery powered lights, preferably which provide representations or replicas of monuments, map layouts and other recreations may be employed in the cushions. Further, audio output, electronic circuits or miniature tape players for projecting audible messages such as safety tips may be employed. The sections and the objects are secured to the cushion by means of fasteners, preferably mating fiber fasteners such as the "Velcro" fasteners. The novel cushions are secured to a seat belt by folding around seat belt, much in the nature of a book.

14 Claims, 4 Drawing Sheets

SEAT BELT CUSHION IN THE FORM OF PEOPLE PLACES AND THINGS

BACKGROUND OF THE INVENTION

1. Field of the Invention

The present invention relates in general to novel seat belt cushions of people, places, things and animals, such as reptiles, amphibians, land mammals, sea mammals, as well as birds and fish, caricatures, insects, and more specifically, to seat belt cushions of the type stated where a plurality of cushion sections, limbs and objects and electronic devices may be adapted for cooperative assembly with the cushions in order to form the representations of people, places, things and animals.

2. Brief Description of the Prior Art

For some period of time, there has been a need for seat belt cushions which are capable of protecting occupants of vehicles and also unborn children carried by female occupants. These cushions are designed to protect, for example, the fragile female breast, the upper stomach, lower stomach, and for that matter the neck area. A cushion of this type is required which would totally encircle the seat belt with a plush form of padding and would absorb any impact in two or more stages. This cushion could be made in the form of lovable characters, stuffed animals and toys so that children and adults would be more prone to use the cushions for protection from and along with the seat belts.

The provision of protective seat belt cushions of this type has been almost totally neglected and the absence of these cushions, particularly in the novel form of loveable characters, stuffed animals and toys has presented a long felt need.

Recently, and surprising, a seat belt pad or attachment has been commercially marketed. This device, however, is very limited in makeup, structure, application and its protective qualities and other essentials are limited. This seat belt pad or attachment which has been recently commercially marketed does not present the novel features present in the protective seat belt cushions of the present invention.

OBJECTS OF THE INVENTION

It is, therefore, a primary object of the present invention to totally encircle a seat belt or at least a portion of a seat belt with plush padding to thereby provide a substantial degree of protection regardless of the direction of a force vector imposed upon a body during an impact.

It is also an object of the present invention to provide a protective seat belt cushion of the type stated to provide maximum protection to vital areas of the body even under conditions of maximum impact and particularly provide protection to the female breasts and upper and lower stomach area.

It is a further object of the present invention to provide a seat belt cushion of the type stated and fastening or joining means which will not restrict accessibility to a seat belt buckle or release button, even though the buckle may be located in the center of and encircled within the protective cushion of the present invention.

It is a further object of the present invention to provide seat belt cushions in a novel form such as in the form of people, places and things and particularly loveable characters, stuffed animals and toys.

SUMMARY OF THE INVENTION

The foregoing objects, together with other objects and advantages which will become apparent from the following detailed description of preferred embodiments of the invention are achieved in a protective seat belt cushion formed of a plurality of sections, limbs, cushion sections as well as objects and electronic devices. These various objects and sections, limbs and electronic devices, may be adapted for cooperative assembly in order to form seat belt cushions in the form of people, places, things animals, birds and insects These objects and particularly, electronic devices may provide means to communicate messages such as messages in the form of safety tips. Thus, in one embodiment, a miniature tape or electronic circuit which provides messages may be employed.

The sections and objects are secured to the cushion by joining means such as fiber fastener strips which may be on the sections and objects and on the cushion Preferably, fiber fastener strips of the type offered under the mark "Velcro" and snap fasteners and coil housings which wrap around the seat belt may also be employed. It is preferable to provide a joining means which secures the cushion to the seat belt without covering the belt buckle and the release button.

DETAILED DESCRIPTION OF PREFERRED EMBODIMENTS

Figure 1:
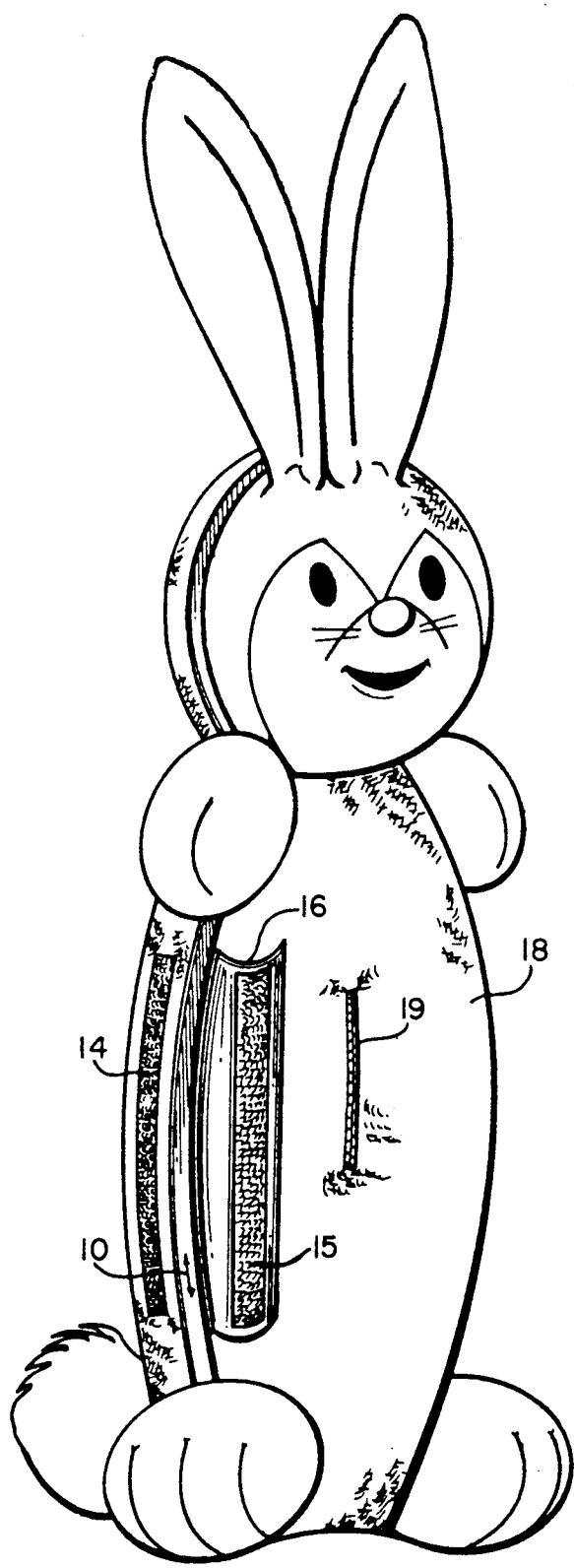
FIG. 1 is a perspective view of a novel seat belt cushion in a form of a bunny rabbit and which opens in the manner of a book to be secured about a seat belt within the center portion thereof.

A perspective view of FIG. 1 illustrates a novel seat belt cushion in the form of a bunny rabbit 18 in accordance with the present invention. The seat belt is capable of extending into and through the opening 10 which extends through the cushion 18 from one transverse side to the other transverse side. The cushion may be secured about the seat belt in the closed position by means of a fastener strip 14 which coacts with another fastener strip 15.

By further reference to FIG. 1, it can be observed that the fastener 15 is located on a flap 16 and this flap 16 may have another fastener on its opposite side. In this way when the cushion 18 is fully opened, there may be another character or depiction of a character located at the central opening 10. The fiber fastener strips 14 and 15 are preferably those fiber fasteners strips marketed under the trademark "Velcro", that is where strips containing hooks and strips containing loops are employed. However, other fiber fastener strips could be employed in accordance with the present invention.

The cushion 18 is also provided with a zippered access opening 19 in order to obtain access to the padding material. Thus, when it is desired to change or remove any of the padding material or add additional padding material, it is only necessary to open the zipper 19 for access thereto.

Figure 2C:
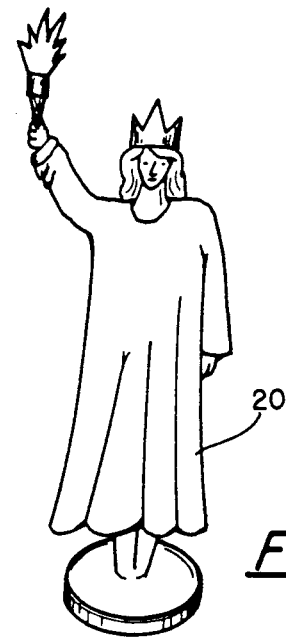
FIGS. 2a, 2b and 2c are perspective views of a novel seat belt cushion in a form which has representation of places and which is secured to a seat belt by means of a coil housing.
Figure 2B:
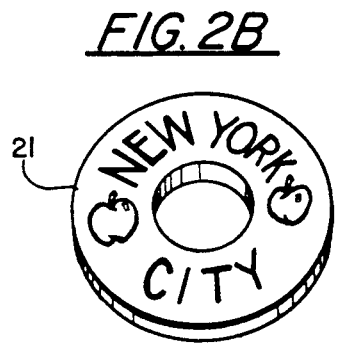
Figure 2A:
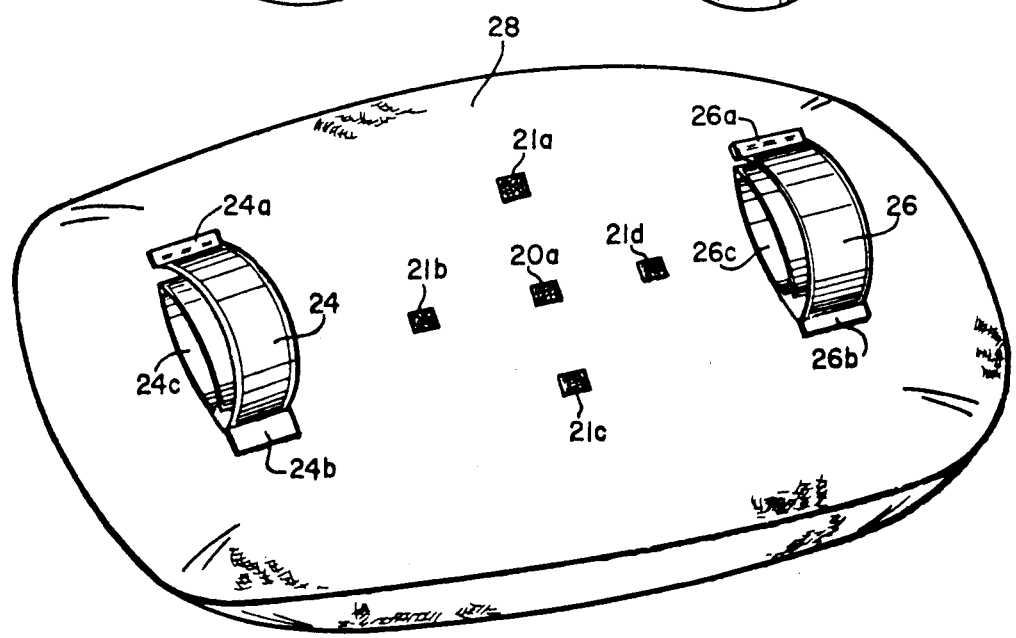

FIG. 2 is a perspective view of a seat belt cushion 28 in the form of a place, that is, a geographical location. A name tag 21 provided for use with this seat belt cushion and reveals the name of that particular place and in this embodiment is New York City. A monument 20 may be located on the tag 21 and the name tag 21 may be secured to the cushion 28 by means of fasteners 21a, 21b, 21c and 21d. The monument or other object 20 may be secured to the cushion 28 by means of the fastener 20a. The cushion 28 may be secured to the seat belt through the use of coil fasteners 24 and 26 which in effect form a coil to loop above the seat belt. One end 24a of the coil fastener and one end 26a of the fastener is stitched to the cushion 28. The other ends of the coil fasteners, that is the fasteners 24b and 26b are fastened to the cushion 28 and the tongues 24c and 26c of the coil fasteners wrap about the seat belt.

Figure 3:
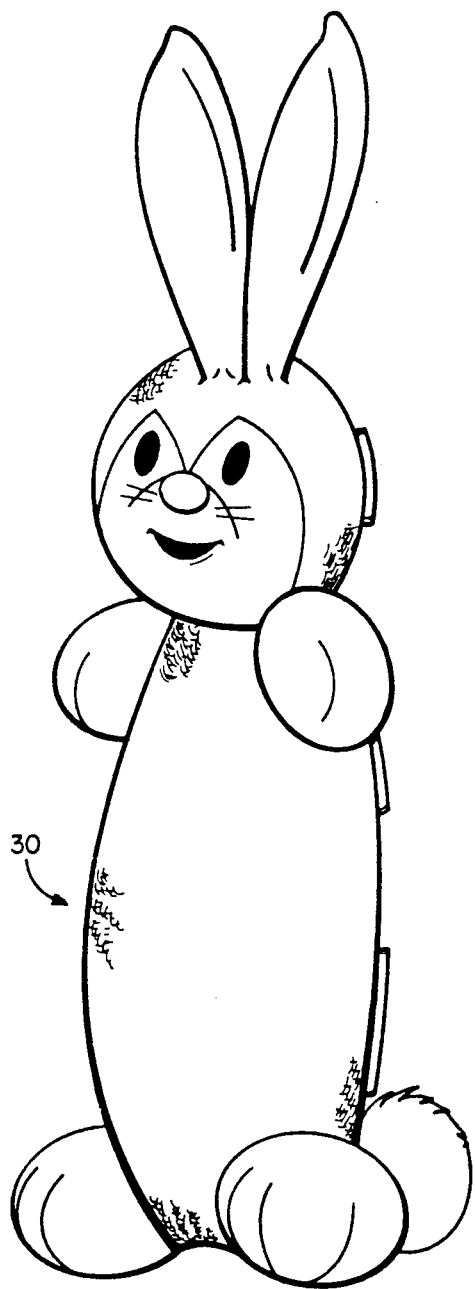
FIG. 3 is a perspective view of a novel seat belt cushion in the nature of a toy bunny rabbit, somewhat similar to FIG. 1.

FIG. 3 is a perspective view of a novel seat belt cushion 30 where it appears as a normal toy. However, this is a unique toy in that it reduces injuries and may save lives, particularly lives of unborn children.

Figure 4:
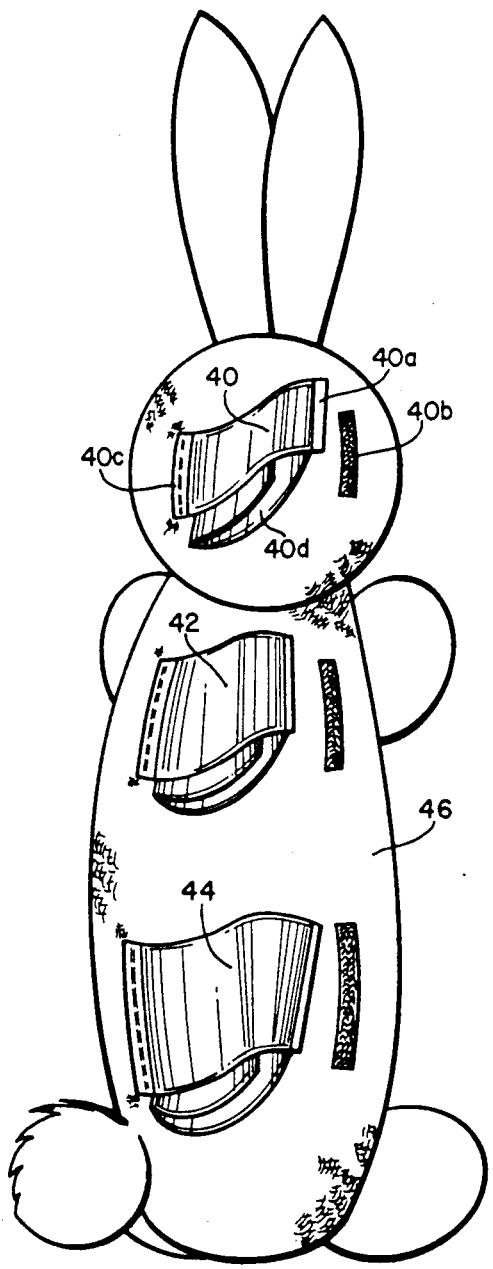
FIG. 4 is a perspective rear view of the seat belt cushion of FIG. 3 and which employs three coil fasteners on the rear portion thereof.

FIG. 4 is a perspective view of a novel seat belt cushion 46 and which may actually be the rear construction of the seat belt cushion 30 shown in FIG. 3. This novel seat belt cushion 46 is provided with three coil fasteners 40, 42 and 44 which are secured to the rear surface. One end 40c of the coil fastener 40 is stitched to the cushion 46. The other end 40a has a fastener secured thereto and interacts with a fastener 40b on the cushion itself. A tongue 40d wraps about the seat belt and in this way it is possible to secure the cushion to the seat belt. Each of the other coil fasteners 42 and 44 operate in essentially the same way.

Figure 5:
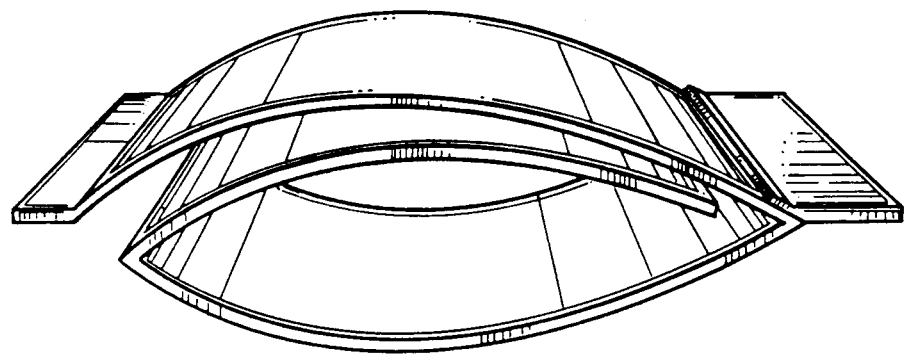
FIG. 5 is a perspective view of coil fasteners which may be used with the seat belt cushions.

FIG. 5 is an enlarged perspective view of a coil fastener of the type which may be employed in the novel seat belt cushion of the present invention.

Figure 6:
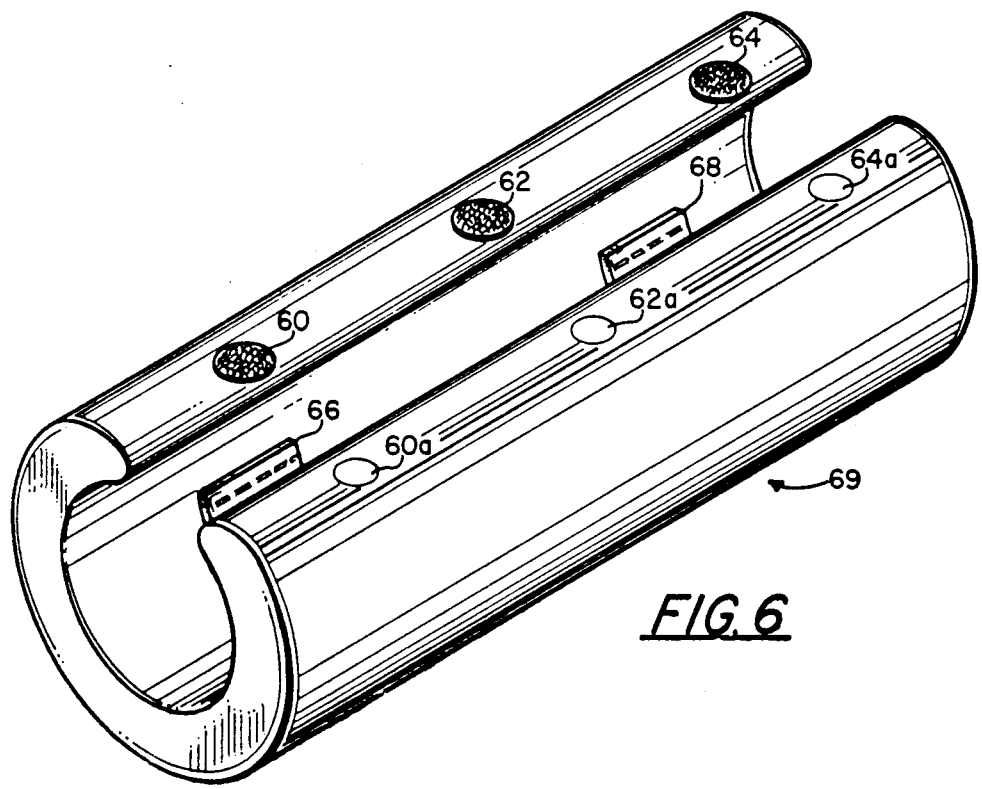
FIG. 6 is a perspective view of a novel seat belt cushion which encircles the seat belt with plush padding.

FIG. 6 is a perspective view of a further version of a novel seat belt cushion 69 which is constructed in accordance with the present invention. A fastener 60 interacts with a fastener 60a. In like manner, a fastener 62 interacts with a fastener 62a and another fastener 64 interacts with a cooperating fastener 64a. A coil fastener 66 and a coil fastener 68 are provided for securing the protective cushion 69 about the center of a seat belt and to thereby encircle the seat belt with a form of plush padding. Fasteners may also be added to this cushion in order to secure heads, limbs, objects or other devices to the cushion in order to provide a character or representation to the cushion.

In the embodiment of FIG. 6, it can be observed that the seat belt cushion effectively envelopes and wraps about the seat belt and is openable and closable from opposite ends, much in the nature of a book. The same construction essentially holds true in the seat belt cushion of FIG. 1. While the opening 10 in the seat belt cushion of FIG. 1 could be an elongate slot, it could also be in the form of an elongate opening where the seat belt cushion could be hinged at its lower end or its upper end for opening in a type of clamshell construction to thereby receive a portion of a seat belt, encircle that seat belt and enclosed around the seat belt.

Figure 7:
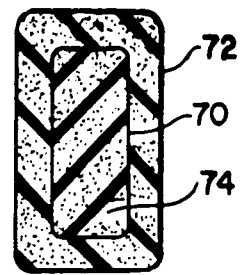
FIG. 7 is a sectional view showing a padded foam block which may be used as part of the padding material in the seat belt cushion of the present invention.

FIG. 7 illustrate a foam block of padding material such as conventional plastic foam material which may be used as the padding in the seat belt cushions of the invention. This foam padding block 70 is initially provided with a hollowed-out area 72. This hollowed-out area could be sealed and filled with a gaseous material such as air or the like. In the embodiment of the invention as illustrated in FIG. 7, an additional fiber or foam material 74 is inserted in the hollowed-out area. In accordance with this construction, there is a two stage impact absorption. In other words, a first stage of impact absorption results from the foam block 70 and a second stage results from the interior foam material 74.

The novel seat belt cushions and coil fasteners as heretofore described are distinguished by a plurality of sections, objects, devices and means for joining these sections. In this way, it is possible to form a seat belt cushion which can adopt the form of and resemble people, places, things and animals. The ability of the seat belt cushion to completely encircle the seat belt with plush padding provides a substantial degree of protection. As indicated, the seat belt cushion can open like a book and also can be in a reversible form and provide access to a belt buckle and a release button. In the embodiments which employ a coil fastener, that fastener is capable of securing the cushion to a seat belt and this will also allow access to the belt buckle and the release button. The tongue of the coil fastener may provide an added degree of security.

It should be understood that while the various limbs, objects and things may be secured to the cushions by fasteners, such as fiber fastener strips, they also may be permanently secured to the cushions. The coil fasteners may also be used to secure pre-existing stuffed animals, toys and pillows if they are sufficiently padded or modified.

Although the drawings and specification disclose the best mode of the invention which I have contemplated to embody my invention, it should be understood that the invention is in no way limited to the details of this disclosure. In further practical applications of my invention, some changes in form and construction may be made in order to conform to certain circumstances without departing from the spirit and scope of the invention and would be encompassed by and within the scope of the appended claims.

I claim:

1. A novel seat belt cushion comprising:
   (a) any of a plurality of sections, limbs, cushioned sections, objects, things and electronic devices adapted for cooperative assembly to form representations of people, places, things, animals, birds, caricatures or insects, and where two or more of said seat belt cushions can be joined together,
   (b) means forming at least one opening in said seat belt cushion to receive a portion of a seat belt of a vehicle, said means forming an opening comprising a pair of cushion portions which are hingedly connected together and which can open to thereby form said opening to receive a seat belt and which can close about said seat belt to fully encircle a portion of the seat belt, (c) padding means in said seat belt cushion and constructed for for absorbing the force of an impact in at least two stages, (d) first joining means for securing cushioned sections, objects, devices, things or limbs to said seat belt cushion, and (e) second joining means for securing said seat belt cushion to a seat belt while allowing access to a buckle and a release button of a seat belt system.

2. The novel seat belt cushion according to claim 1 wherein said seat belt cushion is reversible.

3. The novel seat belt cushion according to claim 1 wherein said novel seat belt cushion has at least one opening for removal of contents.

4. The novel seat belt cushion according to claim 1 wherein said second joining means secures said novel seat belt cushion to dashboards, seat backs and other surfaces of a vehicle.

5. The novel seat belt cushion according to claim 1, wherein said first joining means are Velcro fastener strips.

6. The novel seat belt cushion according to claim 4 wherein said padding means comprises at least one sheet of foam padding material of natural fiber or synthetic fiber, shredded foam padding or other padding material, and an outer sheet layer encloses said padding.

7. The novel seat belt cushion according to claim 1 wherein said padding means comprises padding material molded to a desired shape.

8. A novel seat belt cushion adapted for removable disposition about a seat belt buckle or a portion of a seat belt or both, said seat belt cushion comprising:

(a) a main cushion in the shape of a body of a living or fictional creature, said main cushion being comprised of a first body section and a second body section, (b) hinge means connecting said first body section to said second body section in proximity to an edge of each of said body sections, (c) an interior pocket formed between said first and second section and which interior pocket extends from one end of said main cushion to the other end thereof so that said two sections are openable along said hinge means to expose said pocket and receive said buckle or seat belt or both and where said sections are closable to enclose said buckle or a portion of the seat belt or both, (d) means to releasably lock said two sections together along an edge opposite the edge in proximity to said hinge means so that said seat belt cushion can be held in place on said seat belt and so that it can be removed therefrom, and (e) padding means in the main cushion and adopted to absorb some of the force of an impact.

9. The novel seat belt cushion according to claim 8 wherein a plurality of additional cushioned sections are provided for attachment to said main body cushion to form representation of living or fictional creatures.

10. The novel seat belt cushion according to claim 8 wherein said seat belt cushion is reversible.

11. The novel seat belt cushion according to claim 8 wherein said novel seat belt cushion has at least one opening for removal of contents.

12. The novel seat belt cushion according to claim 8 wherein the means to releasably lock said two sections are Velcro fastener strips.

13. The novel seat belt cushion according to claim 8 wherein said cushion sections each comprise at least one sheet of foam padding material of natural fiber or synthetic fiber and an outer sheet layer which encloses said padding.

14. The novel seat belt cushion according to claim 8 wherein said padding material is molded to a desired shape.

* * * * *